April 29, 1958    H. L. BERT ET AL    2,832,239
PATTERN RESPONSIVE POSITIONING CONTROL FOR MACHINE TOOLS
Filed May 17, 1954    8 Sheets-Sheet 1

INVENTORS
Howard L. Bert
Elmer L. Fagerstrom
By Carlson, Pitzner, Hubbard Wolfe
ATTORNEY

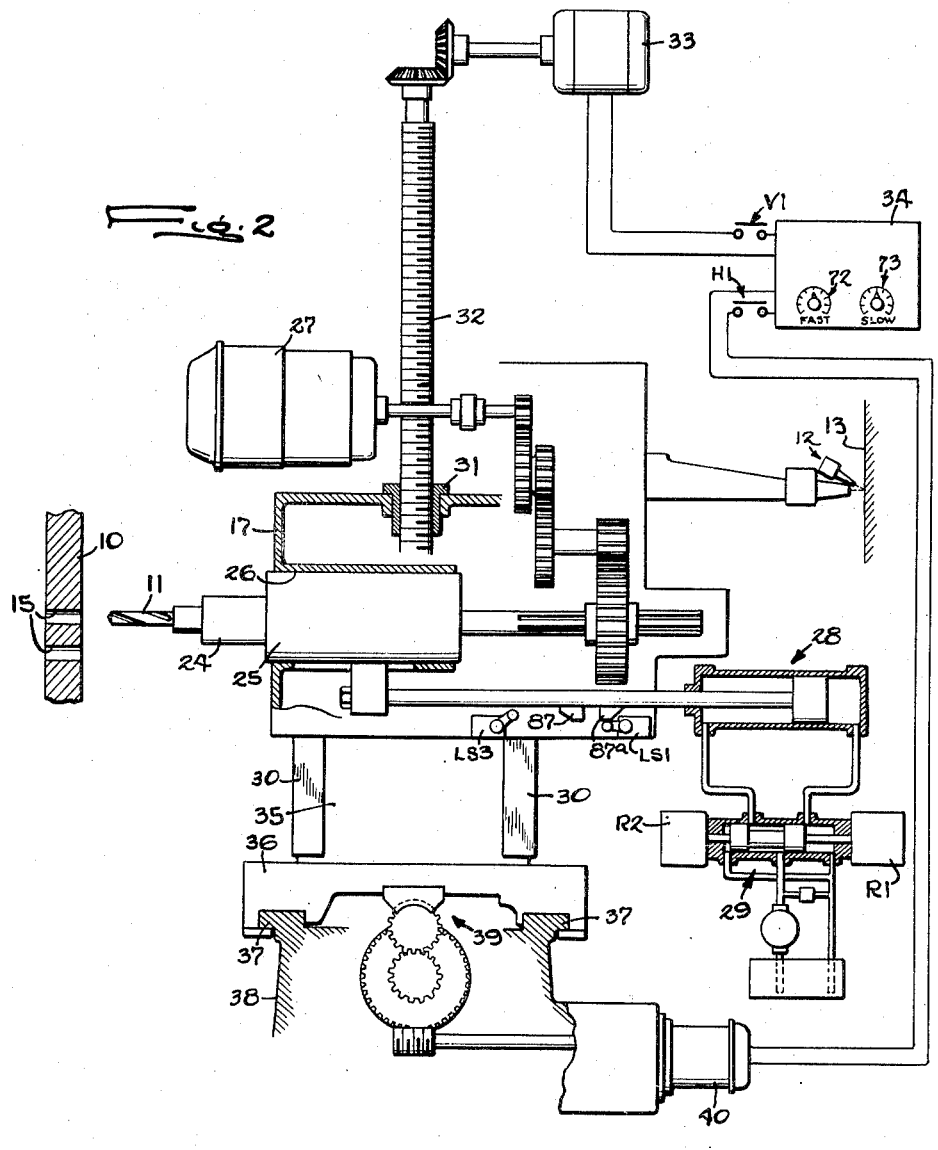

April 29, 1958  H. L. BERT ET AL  2,832,239
PATTERN RESPONSIVE POSITIONING CONTROL FOR MACHINE TOOLS
Filed May 17, 1954  8 Sheets-Sheet 3
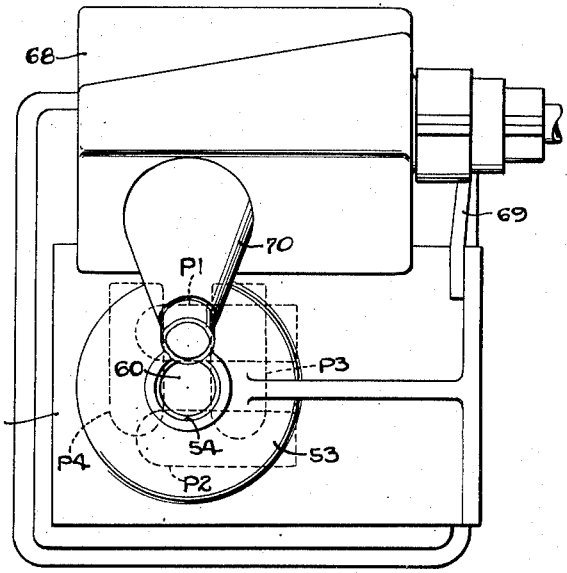
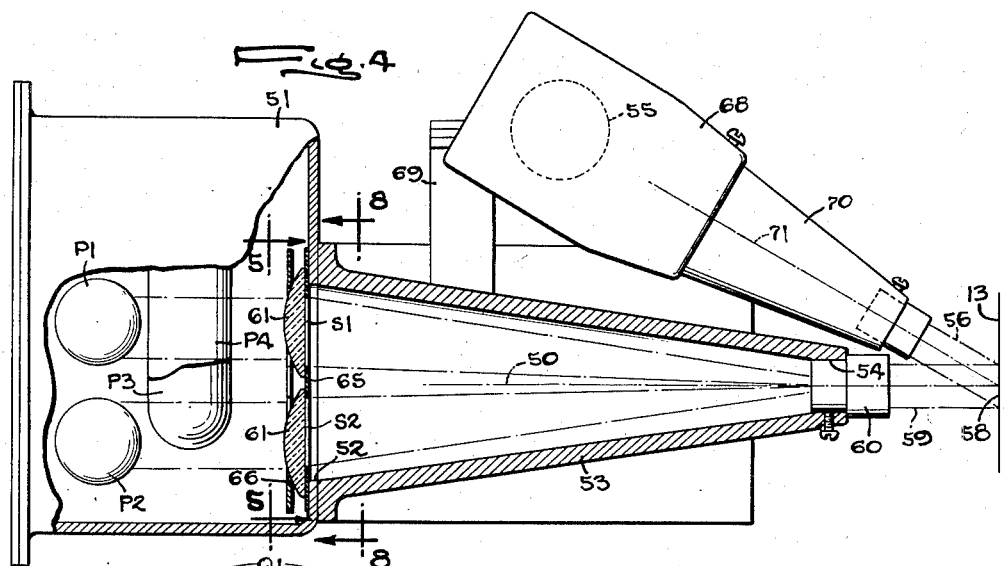
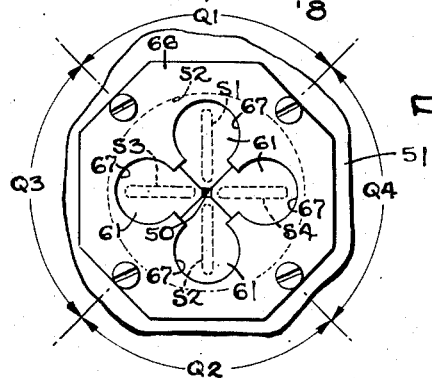
INVENTORS
Howard L. Bert
Elmer L. Fagerstrom
By Carlson, Pitzner, Hubbard & Wolfe
ATTORNEYS April 29, 1958 H. L. BERT ET AL 2,832,239
PATTERN RESPONSIVE POSITIONING CONTROL FOR MACHINE TOOLS
Filed May 17, 1954 8 Sheets-Sheet 4

INVENTORS
Howard L. Bert
Elmer L. Fagerstrom
By Carlson, Pitzner, Hubbard & Wolfe
ATTORNEYS April 29, 1958 H. L. BERT ET AL 2,832,239
PATTERN RESPONSIVE POSITIONING CONTROL FOR MACHINE TOOLS
Filed May 17, 1954 8 Sheets-Sheet 5
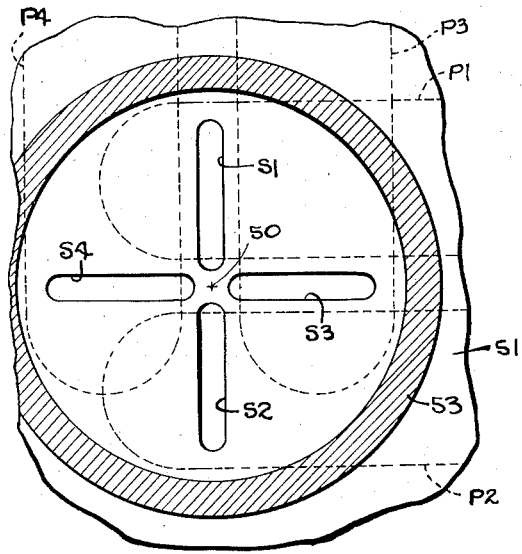
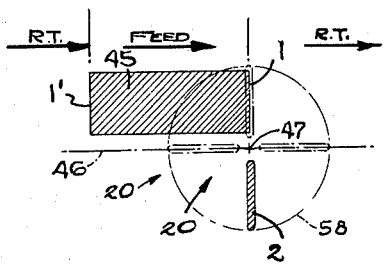
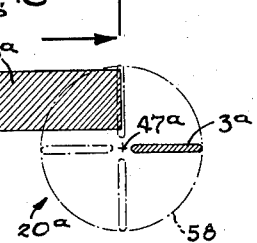
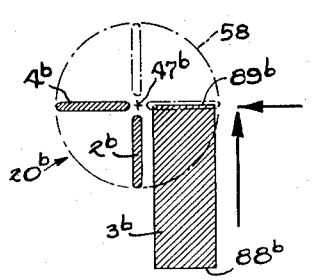
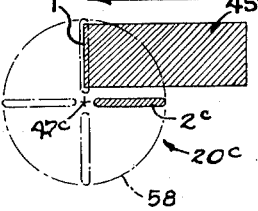
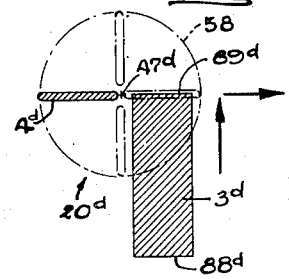
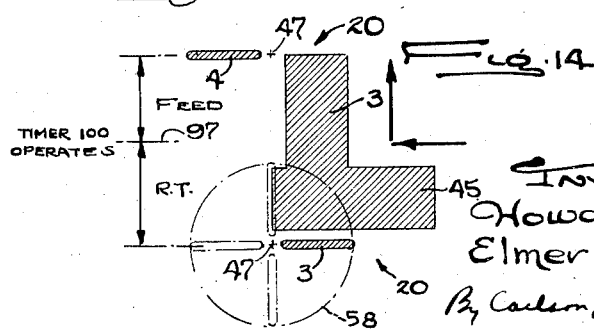

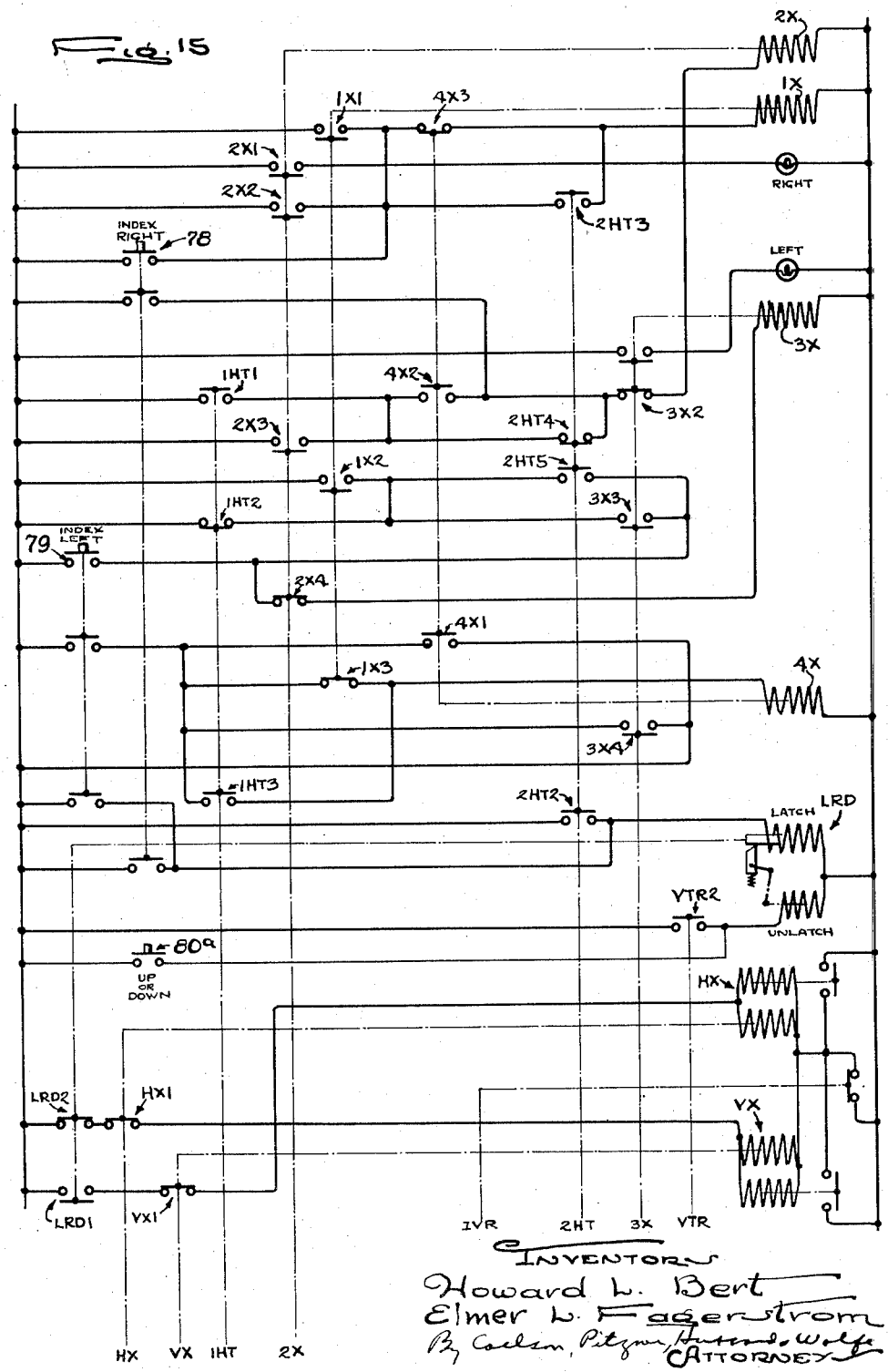

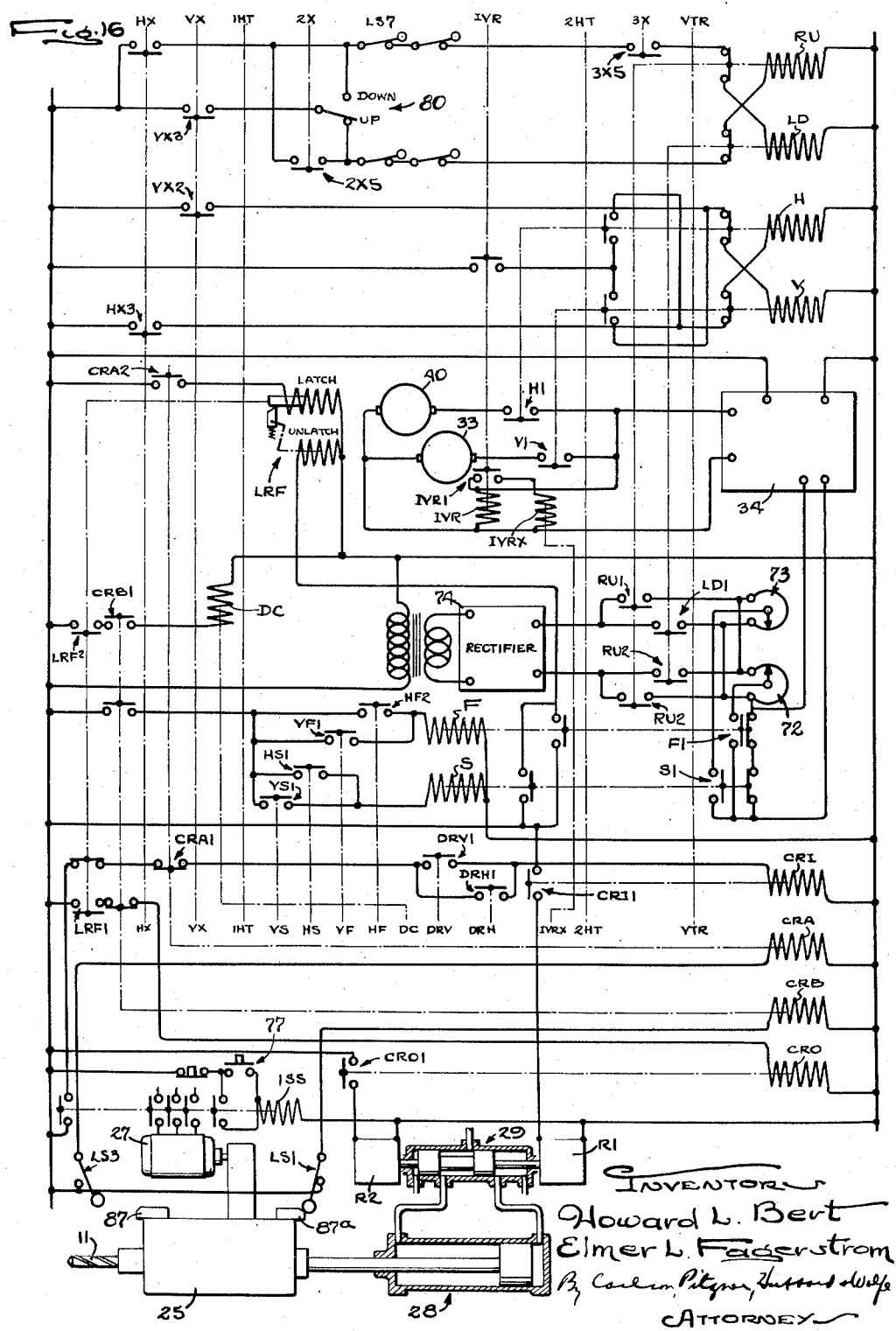

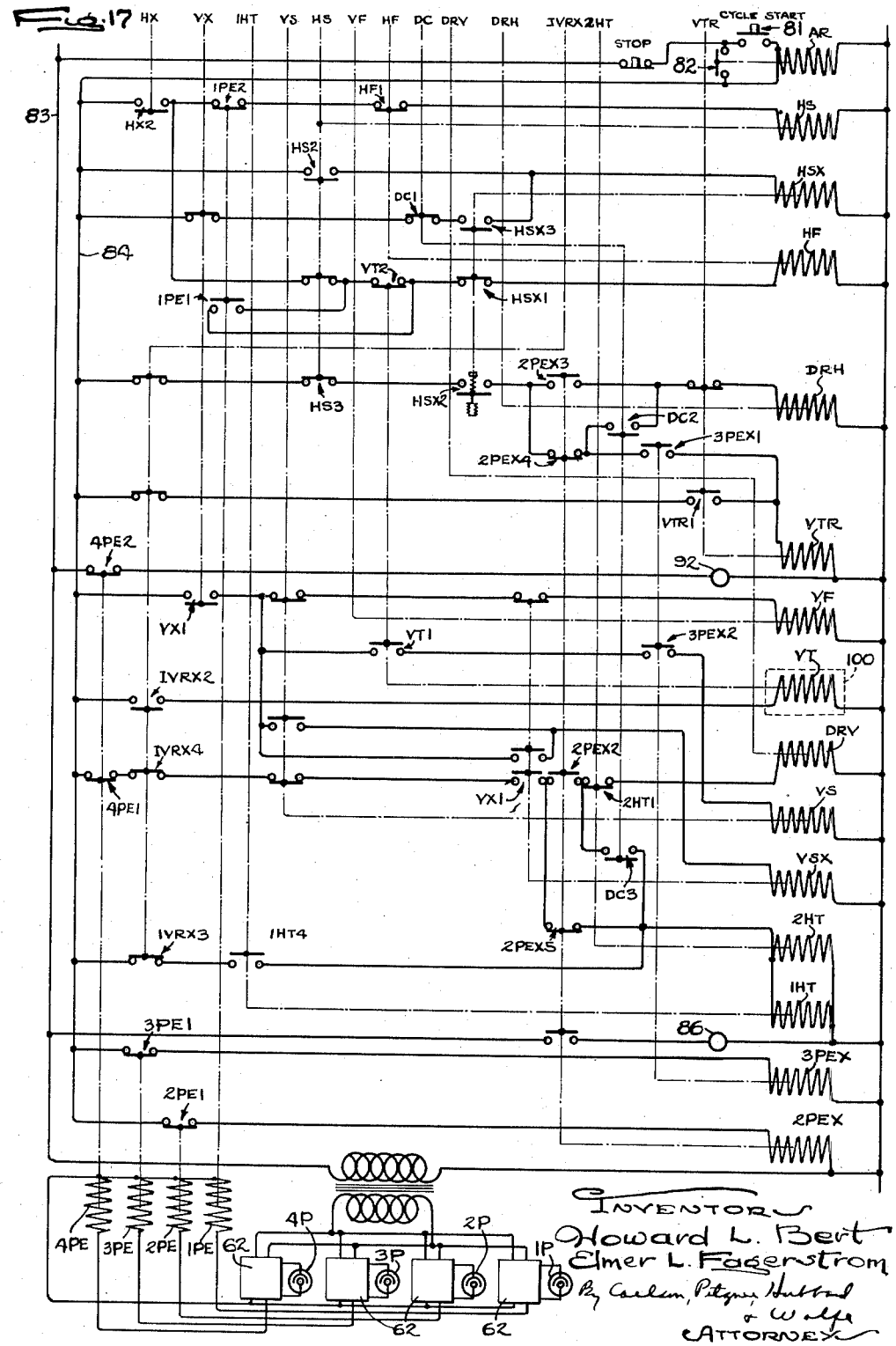

United States Patent Office 2,832,239
Patented Apr. 29, 1958

2,832,239

PATTERN RESPONSIVE POSITIONING CONTROL FOR MACHINE TOOLS

Howard L. Bert and Elmer L. Fagerstrom, Rockford, Ill., assignors to The Ingersoll Milling Machine Company, Rockford, Ill., a corporation of Illinois Application May 17, 1954, Serial No. 430,264

18 Claims. (Cl. 77—6)

This invention relates to a control for sensing changes in the configurations of a pattern and automatically controlling the operation of the actuators of a machine tool to relatively move the work and tool supports and position the same for the engagement of the tool at predetermined points which may be spaced apart in two transverse directions. The invention has more particular reference to a control of the type in which a tracer or feeler and the pattern move back and forth following the relative movements between the work and tool supports.

One object is to provide a novel control of the above character in which the area of the pattern which governs the stopping of the tool in one position incorporates additional information controlling the direction of advance of the tool to the next operating position.

A more detailed object is to provide a positioning control system in which groups of pattern elements of different predetermined configurations operate selectively through a multiple tracer not only to govern the stopping of the tool for operation on a predetermined part of the work but also prepare circuits for selectively initiating movement of the tool and tracer automatically to the next position as soon as the operation on the work has been completed.

Another object is to provide a control of the above character having novel means for slowing down the tool in its approach to each successive position.

A further object is to achieve the foregoing objects by a tracer comprising a novel arrangement of photoelectric feelers operated differentially by the different pattern elements of each group.

Still another object is to adapt the multiple tracer for sensing pattern elements comprising contrasting areas on the surface of a pattern sheet.

A further object is to mount the tool and tracer on opposite sides of the tool support and adapt the tracer for operation by light reflected from a stationary pattern surface facing the work.

Another object is to utilize certain of the control elements in the different pattern groups to govern different functions in the indexing and positioning of the machine tool part.

A further object is to utilize one of the several sensing devices or feelers of the tracer to initiate slowing down as well as interruption of the indexing movements.

Still another object is to incorporate in the control circuits governed by the tracer a novel means for disabling the tracer temporarily as it starts toward the next stopping point so as to avoid interference by the previously used elements of the pattern group.

Another object is to associate with the tracer and its control mechanism a novel means for checking the accuracy of stopping of the machine part and preventing continued operation of the automatic control in the event a deviation from the intended position is detected.

The invention also resides in the novel manner of arranging the different control elements of each pattern group and in correlating their control actions with the work performing movements of the tool.

Other objects and advantages of the invention will become apparent from the following detailed description taken in connection with the accompanying drawings, in which—

Fig. 2 is a similar but skeleton view showing the power actuators and the machine elements operated thereby.

Fig. 3 is an elevational view of the tracer looking from the right side of the machine shown in Fig. 2.

Fig. 4 is a fragmentary side view of the tracer broken away to show the tracer proper in vertical section.

Fig. 5 is a fragmentary section taken along the line 5—5 of Fig. 4.

Fig. 6 is a reduced size elevational view of the illustrated workpiece and the location of the areas operated on.

Fig. 8 is a fragmentary sectional view taken along the line 8—8 of Fig. 4.

Figs. 9 to 14 are enlarged views of the successive groups of pattern control elements shown in Fig. 7, the light slits $s1$ to $s4$ being shown in phantom and superimposed on the corresponding control elements.

Figure 1:
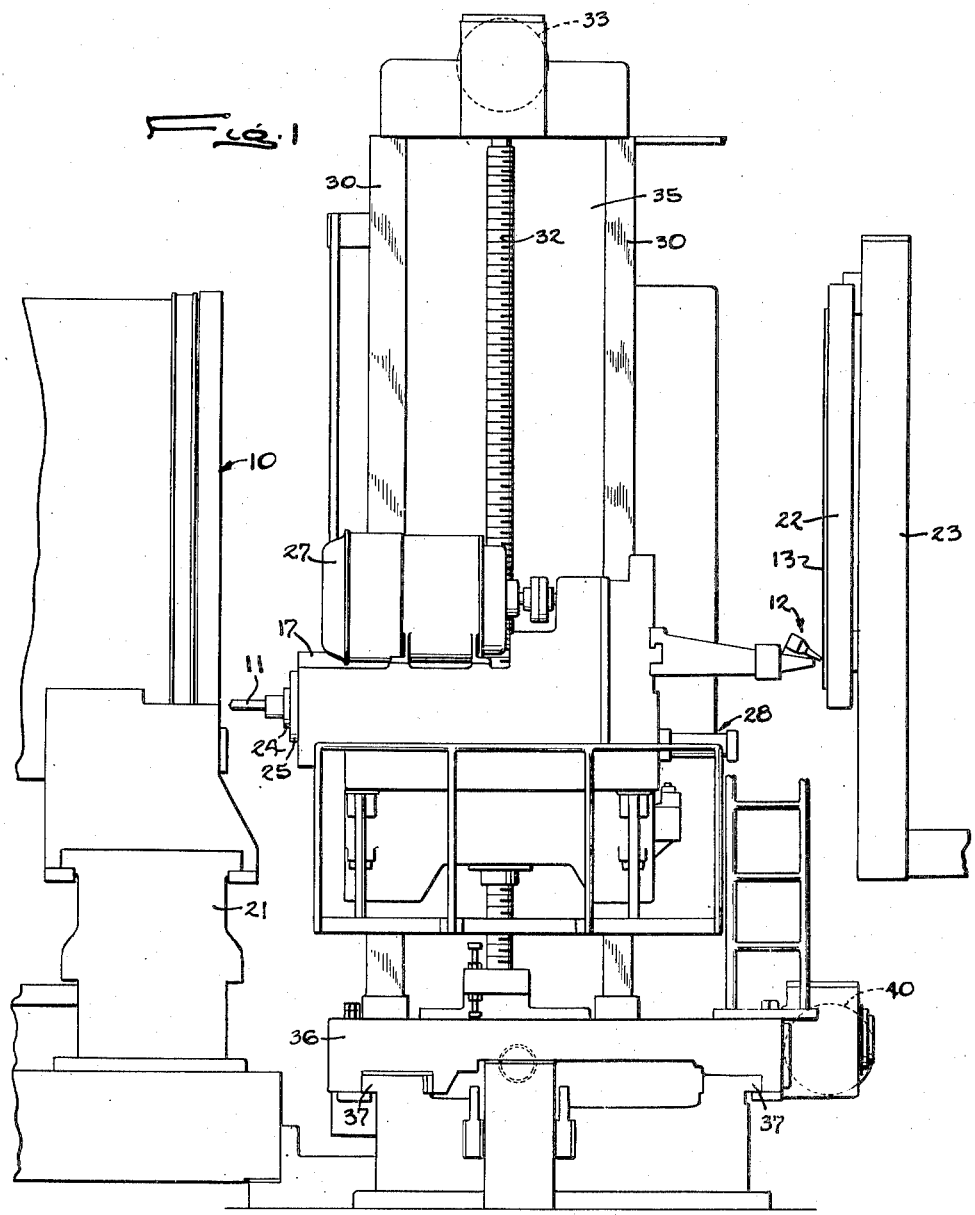
Figure 1 is a fragmentary side elevational view of an automatic pattern controlled machine tool embodying the novel features of the present invention.

Figs. 15, 16, and 17 when arranged end to end form a circuit diagram.

While the invention is susceptible of various modifications and alternative constructions, we have shown in the drawings and will herein describe in detail the preferred embodiment. It is to be understood, however, that we do not intend to limit the invention by such disclosure, but aim to cover all modifications and alternative constructions falling within the spirit and scope of the invention as expressed in the appended claims.

Figure 6:
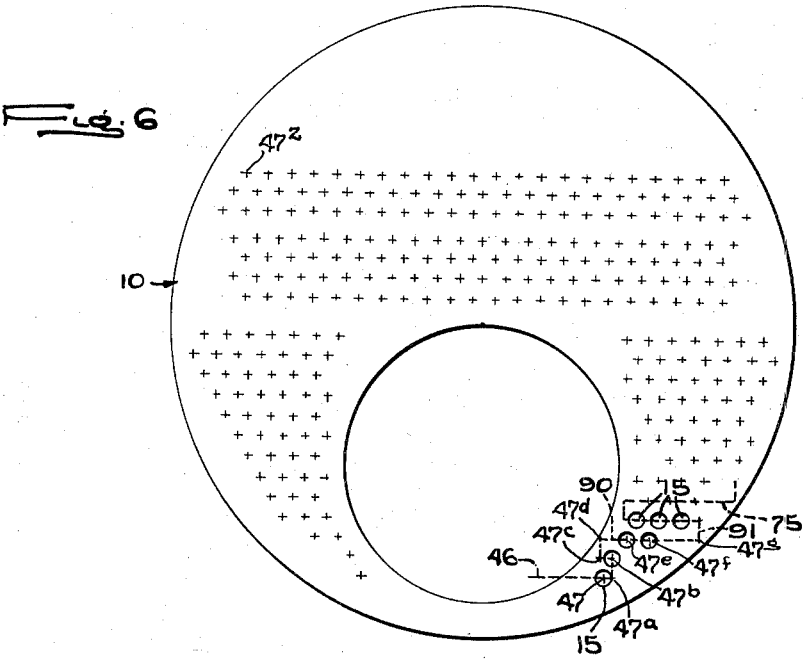

In the drawings, the invention is shown for purposes of illustration incorporated in a machine tool for performing various operations such as hole forming, rolling, flaring on different laterally spaced areas of a stationary workpiece such as the end plate 10 of a boiler, the areas being operated upon by a tool 11 which is moved automatically step by step and along different transverse paths to the successive work areas under the control of a tracer 12 which scans or feels of different areas of a stationary pattern 13. Herein, holes 15 on the various centers shown in Fig. 6 are bored by a suitable drill 11 which, if desired, may be of the trepanning type. After insertion of the boiler tubes in the holes, another tool (not shown) is substituted for the drill and the operation on the successive areas is repeated to roll over the tube ends and form flanges thereon which may be flared by repeating the operations using a third tool.

In general, the workpiece and pattern are disposed in vertical planes and in opposed face to face relation, and the tool 11 is slidable horizontally toward and from the work on a head 17 which is movable in two transverse directions, horizontally and vertically in this instance, in an intermediate vertical plane so that the tool axis may be alined with any point on the work surface. The tracer is mounted on and projects from the opposite side of the head so as to move with the tool head and thus be disposed at all times in feeling relation with a point on the pattern which corresponds precisely with the prevailing position of the tool 11 relative to the workpiece 10.

Referring now to Figs. 1 and 2, the workpiece, in this instance a boiler shell, is secured to a stationary fixture 21 with the end plate 10 disposed perpendicular to the tool axis. Herein, the pattern 13 comprises a sheet of paper or the like secured against the inner face of a plate 22 spaced from the work so that the pattern faces toward and is disposed in a plane parallel to the work surface to be machined. To enable the pattern to be brought into proper register with the workpiece, the plate 22 is mounted in suitable guides on a cross slide on a stationary plate 23 and, through suitable motor actuated screw mechanisms (not shown), may be shifted edgewise to any position in the pattern plane.

The tool 11 is mounted in a suitable chuck on the outer end of a spindle 24 journaled in a quill 25 which is slidable in a guideway 26 on the head 17. Power for rotating the tool is derived from a motor 27 and transmitted to the inner end of the spindle through suitable gearing and a spline coupling. Feeding of the tool into and out of engagement with the work may as shown be effected by a hydraulic actuator 28 connected to the quill 25 and supplied with pressure fluid under the control of a valve 29 shifted to the position shown in Fig. 2 when a solenoid R2 is energized, the actuator 28 then being energized to retract the tool 11. When a solenoid R1 is energized, the actuator feeds the tool forwardly into engagement with the work to drill a hole, completion of the latter being evidenced by closure of a switch LS3 (Figs. 2 and 16) by a dog 87. In the fully retracted position of the drill, a dog 87a closes a switch LS1 as shown in Fig. 2.

The tool head 17 is guided for vertical movement along ways 30 (Fig. 2) and carries a nut 31 mating with a screw 32 adapted to be driven by a reversible electric motor 33 which is started by closure of a switch V1 (Fig. 2) when a relay V (Fig. 16) is energized. The armature winding of the motor is supplied with current from the output of a so-called amplidyne (General Electric No. T-9594786) speed controller 34. When a relay F (Fig. 16) is energized to close its switch F1, the speed controller is activated through an adjustable resistor 72 to cause operation of the motor at high speed. In a similar way, energization of a relay S establishes a circuit through the speed controller for energizing the motor armature to initiate operation at a slow speed determined by the setting of a rheostat 73. The direction of operation of the motor is controlled by changing the polarity of the output of a rectifier 74 connected to the speed controller input. Such a change is effected by relays RU and LD which when energized cause the tool head 17 to be moved upwardly and downwardly respectively during the operation of the motor.

The ways 30 are on a column 35 upstanding from a table 36 which slides along horizontal ways 37 on the machine bed 38. Through a rack and worm drive mechanism 39 (Fig. 2) of well known construction and speed reducing gearing, the table is moved back and forth by a reversible motor 40 started by energization of a relay H (Fig. 16) and closure of a switch H1 (Fig. 2), the speed also being determined by the controller 34 since the motors 33 and 40 in the illustrative circuitry are never operated simultaneously. For this same reason, the relays RU and LD are used to control the direction of operation of the motor 40.

Since, in the present instance, the successive indexing movements of the tool head are either horizontal or vertical, the same relays F, S, RU and LD may be used to control the direction and speed of operation of the motor 40 through the same speed controller 34. This motor starts whenever the switch H1 is closed by energization of the relay H, the tool head then moving to the right or left relative to the work surface and the face of the pattern 13 according to which of the relays RU and LD is energized.

In accordance with the present invention, the tool is indexed from one working position to the next by a horizontal movement, by a vertical movement, or by a succession of such different movements. Each change in the tool position and the selective operation of the tool in the different positions corresponding to the points 47 on the pattern is controlled by a group 20 (Fig. 14) of control elements 1, 2, 3, 4 on the pattern surface acting selectively on different feelers of the multiple tracer 12 and through suitable circuitry governing the operation of the tool and tool head actuators to respectively (a) initiate slowing down of the moving part, (b) control the stopping thereof, (c) determine whether the tool is to be operated in the stopped position, (d) determine the direction of advance to the next position, and (e) check the accuracy of stopping.

Since the tracer in the illustrated embodiment operates photoelectrically, the control elements on the pattern take the form of areas of a color contrasting with that of the pattern background. The latter is of light color in the present instance while the control elements are darkened. In each instance, the control area is of rectangular shape and elongated in a direction transversely of the approach to the associated stopping point 47 so that movement of the scanning beam of light onto or off from an edge thereof will result in a wide change in the amount of light directed to the associated photocell. Also, the rectangles are oriented on the pattern with the lengths of the rectangles paralleling one or the other positioning movements of the tool, that is, horizontal or vertical in this instance.

Figure 7:
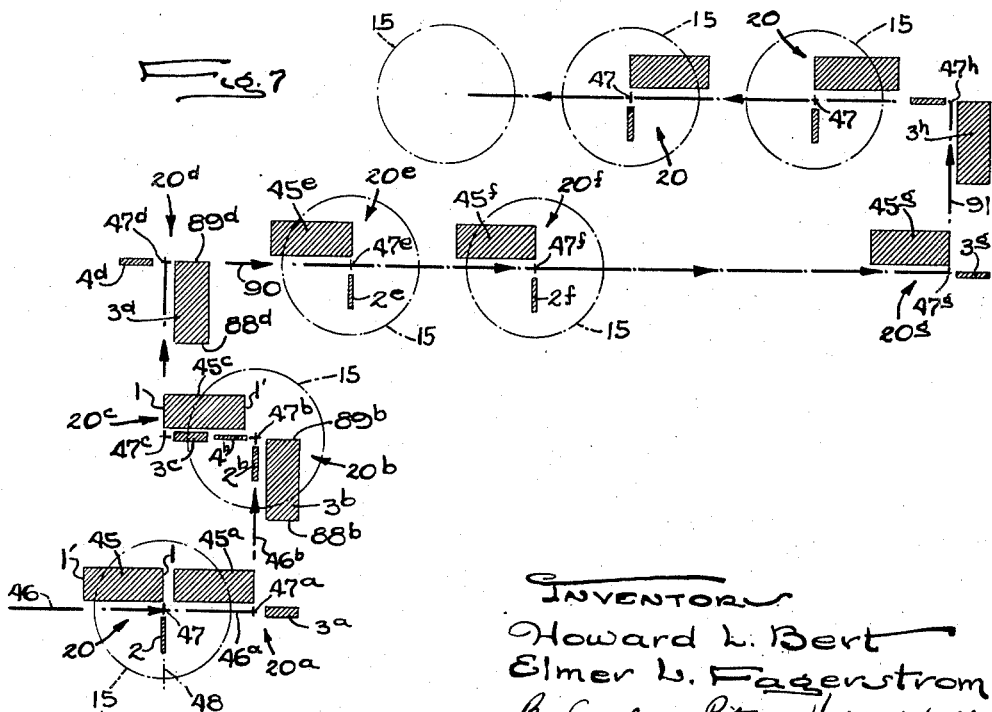
Fig. 7 is a fragmentary actual size view of a part of the pattern, the locations of the holes to be bored being shown in phantom.

Referring now to Fig. 7, the pattern element 1' in the groups 20 controls the slowing down of the motor during horizontal indexing. It comprises an edge of a darkened rectangle 45 which lies alongside the path of approach of the tracer to the stopping point 47 which is controlled by the associated group of elements. The opposite end of this rectangle forms the element 1 for controlling the stopping of each horizontal indexing and is also disposed perpendicular to the direction of the slow approach movement, terminating along a line 48 (Fig. 7) which intersects the stopping point 47.

The tool advance control element 2 comprises a darkened rectangular area of a length equal to the width of the rectangle 45 but of narrow width. This element may be located to one side of the stopping point 47 opposite the stop element 1, or the element indicated at 2a for determining the stopping point 47a (Fig. 7), may extend along the line 46b of approach of the tracer to the next stopping point 47a.

As will appear later, the elements 2, 2a, 2b, etc. of certain groups 20 (Fig. 7) is, after proper switching in the control circuits, used alternatively to perform the functions of controlling the tool advance and checking the accuracy of the stopping. In other of the groups, the position checking element indicated at 4 (Fig. 14) and 4b and 4d (Fig. 7) comprises a rectangle of the same size and shape as the rectangle 2 but disposed lengthwise of the line 46 through the stopping point and parallel to the rectangle 45.

The direction selecting element 3 (Fig. 14) and 3a, 3b, etc. (Fig. 7) is a narrow darkened rectangle of the same size and shape as the elements 2 and 4. It is centered on the line 46 of movement of the tool head to the stopping point 47 but is disposed beyond this point. Alternatively, the pattern element 3 may be elongated in the direction of indexing (see 3b of Fig. 7) and utilized instead of the elements 1' and 1 of an area 45 to control the slow down and stopping. In each of the control groups 20, it will be observed that the elements 1, 2, 3 and 4 are angularly spaced ninety degrees apart around the stopping point 47.

The tracer 12 incorporates four separate devices that feel of the respective control elements 1 and 1', 2, 3, 4 and operate independently to sense the presence or absence of one or more of these elements grouped about any stopping point 47. With the photoelectric type of scanning illustrated herein, the sensing devices comprise photoelectric cells P1, P2, P3 and P4 (Figs. 4 and 8) grouped around an axis 50 movable with the tool head 17 and coinciding with the point 47 on the pattern in each stopped position of the tool head. The cells are disposed within a box-like casing 51 secured to the side of the tool head adjacent the pattern and having an opening 52 therein which is closed by the base end of a conical tube 53 concentric with the axis 50 and projecting outwardly to a circular end opening 54 disposed adjacent but spaced from the pattern 13.

Light from a source such as an electric lamp 55 is converted to a generally cylindrical beam 56 which is directed diagonally against the pattern surface. From a circular area or spot 58 on the latter, the light is reflected back along a path 59 into the tube opening 54 and through a suitable focusing lens 60 by which the light is distributed over two right angular quadrants Q1 and Q2 (Fig. 5) centered on the axis 50 and bisected by the vertical plane in which this axis moves as the tool and tracer head 17 is raised or lowered. Similarly, the receiving quadrants Q3, Q4 are bisected by the horizontal plane in which the axis 50 moves as the tool head is shifted horizontally to reposition the tool.

After passing through horizontal and vertical slits $s1$, $s2$, $s3$, $s4$ bisecting the respective quadrants, the light is condensed by lenses 61 into separate beams directed onto the photocells P1 to P4 respectively. The lenses and the slits are so sized, shaped, and arranged with reference to the axis 50 and the size, shape and location of the pattern control elements 1, 2, 3 and 4 of any group so that in any stopped position 47 of the tool holder 17, the respective photocells will scan and be affected only by light reflected from the pattern areas which are or may be occupied by the corresponding control elements of the group 20 whose center 47 is intersected by the tracer axis 50. The slits $s1$—$s4$ are cut in a sheet 65 secured to the outer wall of the photo cell casing 51 and the lenses are held in place by a masking sheet 66 having apertures 67 therein larger than the slits.

The lamp 55 is housed in a casing 68 mounted on a bracket 69 projecting from the tool head 17. The condensing lens system is in a tapered tube 70 projecting from the casing with its axis 71 extending along the center line of the light beam 56.

The photocells are associated in a manner well known in the art with electronic amplifiers 62 (Fig. 17) whose outputs control the energization of relays 1PE, 2PE, 3PE and 4PE. That is to say, when any photocell, for example P1, is energized by light reflected from an unshaded area or the background of the pattern 13, the corresponding relay 1PE is energized. Conversely, when the intensity of the light affecting this cell is reduced, as when the pattern area scanned by the cell is shaded or darkened, the relay will be deenergized.

As stated previously, the slowing down of the tool head and tracer during horizontal indexing is controlled by a different pattern element, that is the ends 1' and 1 of an area 45, than the area 3 which is utilized to effect the slow down and stopping in the case of vertical indexing. The latter area also constitutes the direct selecting element of the groups 20 and in performing these three functions, the area 3 acts, as will appear later through the slit $s3$ and the photocell 3P.

The invention also contemplates utilizing certain of the photoelectric feelers, the photocell P1 in this instance, to perform more than one function, namely slow down of the motor, as the tracer passes off from a light area onto a darkened area of the pattern and then stopping of the motor instead of restoring its high speed operation, when the tracer passes off from the darkened area 45 onto a light area. This dual action is made possible by a unique arrangement of the relays HSX and VSX later to be described. Then after the stopping function has been performed, the former control by the photocell 1 is restored as an incident to the performance of one of the other operations, that is the tool actuation or direction selection which takes place during dwelling of the tool head and tracer in the stopped position.

As will appear later, a timing device 100 (Fig. 17) is incorporated in the relay VT to delay the opening of the switch VT1 following energization of the relay. This switch is utilized to render the tracer control insensitive to light changes produced by the pattern in the initial movement of the tracer away from certain of the stopped positions, particularly when changing from horizontal to vertical indexing. This condition arises because, as described above, the photocell 3, in addition to its direction selecting function, also serves to effect slow down and stopping when the tool head is moved vertically. The purpose of this auxiliary control is to enable the tracer to start out at the rapid rate and to pass over any of the darkened previously used areas that might otherwise slow down or stop the actuating motor. One example of this auxiliary control is found in Fig. 12 wherein the slit $s3$ previously used in selecting the next vertical index must cross the area $45^c$ in the upward movement of the tracer toward the next position $47^d$. In this case, the tracer control is rendered ineffectual until the slit $s3$ passes the upper edge of the area $45^c$.

A similar instance is illustrated in Fig. 14 wherein, due to the closeness of the stopping points along a vertical index line, the stop control areas 45 and 3 overlap each other along the path traversed by the slit $s3$. In such a case, the disabling switch VT1 controlled by the timer 100 renders the tracer ineffectual as the slit $s3$ crosses the area 45, active control by the tracer being restored when the tracer has reached a line 97 at which point the timer closes the switch VT1. Thereafter the area 3 is again effective on the tracer so that the switch VT1 and the switch 3PEX2 energize the relay VS whereupon the indexing motor is slowed down immediately.

In the case of certain horizontal indexing movements, such as movement away from the point $47^d$ (Figs. 7 and 13), it is necessary for the slit $s1$ to pass across a previously used darkened area $3^d$. To render the tracer insensitive to this area, a second switch VT2 is operated by the timer 100 and its closure prevents effective operation of the photocell P1 until the tracer has passed beyond the area $3^d$.

The pattern and the tracer constructed and arranged as above described may be utilized through various circuits to control the selective energization of the solenoids and relays above referred to and, by starting and stopping the motors 33 and 40 and the tool actuator 28, cause the tool 11 to be indexed successively and automatically to any desired number of predetermined positions and to be fed into and out of the work in selected ones of these positions. The circuitry employed for any given workpiece will of course vary according to the geometrical arrangement of the work areas to be operated upon and the sequence in which the positioning movements and the tool operations are to be performed.

*Operation*

The exemplary circuit formed by arranging Figs. 15, 16, and 17 in end to end relation may be utilized with the pattern shown in Figs. 6, 7, and 9 through 14 to advance the tool step by step along a path 75 (Fig. 6) through a succession of stopping points 47 and, during the dwells in selected ones of the points, advance and retract the tool 11 to form the holes 15. The operation of the various parts and circuits in producing this sequence will now be described, it being noted that the pattern elements appear in Figs. 7 and 9 to 14 as viewed from the outside or back of the pattern sheet 13, that is to say, looking through the sheet and toward the work surface so that the tracer appears to move relative to the pattern in the same direction that the tool moves relative to the work.

In the circuit diagram, certain parts well known in the art and commonly used in the manual control of machine tools have been omitted or simplified. The reference characters of the different relays are those adopted by the machine manufacturer and the switches actuated by each relay bear the same reference with the addition of numerals corresponding to the respective switches which are shown in the deenergized condition of the relays. The different relays involved in effecting the horizontal indexing are prefixed by the letter "H" while the relays having a prefix "V" control the vertical indexing. The relays controlled by the photocells include the reference letters "PE." Certain of the relays are constructed as is well understood in the art so as to provide a momentary delay between the operation of certain of the associated switches. In Figs. 15 to 17, the relay switches which initiate or terminate machine functions or condition circuits performing such functions are indicated by reference numbers, those switches performing safety or other functions not directly involved in the machine cycle are left unnumbered.

To prepare the machine for automatic operation, the pump for the hydraulic tool actuator 28 is started along with the motor generator sets for energizing the armature windings of the motors 33 and 40. The spindle drive motor 27 is started by closure of a switch 77 to energize a relay 1SS. By energizing certain of the relays under the control of manually operable switches including 78, 79, 80, and 80ᵃ, it is possible, through circuits about to be described, to operate the motors 33 and 40 and bring the tracer axis 50 onto the line 46 (Figs. 7 and 9) leading to the first of the stopping points 47.

In the following description of the operation, it is assumed that the machine has completed a sequence of operations on one workpiece and that the circuits are left conditioned for the cycles to start machining of a new workpiece. Since the first indexing of the tool is to be to the right, the switch 78 is closed manually energizing a relay LRD which is latched closed and which closes its switch LRD1 to complete a circuit for the relay HX whose switch HX2 is thus closed to condition the relays HS and HF by which the horizontal indexing is controlled. The relay 2X is also energized by the switch 78 to select the relay RU by which indexing to the right is controlled. The automatic cycle may then be started by momentary closure of a push button switch 81 energizing a relay AR which closes a switch 82 to complete a sealing circuit for the relay and to connect the power line 83 to a supply conductor 84 for the relays controlled by the photocells. Power is thus applied to the relay HF through the then closed switch HX2. Closure of a switch HF2 by the relay HF energizes the relay F whose switch F1 closes to connect the rheostat 72 to the speed controller 34 and initiate operation of the motor 40 through the switch H1 previously closed in response to closure of the switch 78 mentioned above.

In the ensuing movement of the tool head to the right along the line 46, all four of the photocells receive light from unshaded portions of the pattern so that all of the relays 1 to 4PE remain energized. The tool moves toward the right at fast speed and the circle 58 of light scans the pattern eventually encountering the end 1′ of the first shaded area 45. The resulting reduction in light reflected through the slit s1 causes the photocell 1P to be deenergized whereupon its relay 1PE opens the switch 1PE1 to deenergize the relay HF and close the switch 1PE2 which through the switch HF1 of the deenergized relay energizes the relay HS, the fast relay F being deenergized by opening of the switch HF2. The resulting closure of the switch HS1 energizes a relay S which closes a switch S1 to inert a larger resistance 73 into the power circuit thus reducing the speed of the motor 40. The relay HS also closes a switch HS2 to energize the stop relay HSX which is sealed in by a switch HSX3. A switch HSX1 is thereby opened to disable the circuit of the relay HF and the deenergized fast relay F so as to prepare for stopping of the motor 40.

The tool head and tracer then move at slow speed until the end 1 of the shaded area 45 is reached at which point light is again reflected through the slit s1 onto the photocell P1 so that the relay 1PE is again energized. This opens the switch 1PE2 to deenergize the relay HS and closes the switch 1PE1 but, because the switch HSX1 is then open, the relay HF remains deenergized and the motor 40 comes to a stop. In this position, a portion of the reflected light is interrupted by a shaded area 2 which is effective through the slit s2 to deenergize the photocell P2. The relay 2PE is thereby deenergized and the switch 2PE1 closes to complete the circuit to a relay 2PEX. The switches of the latter are effective to light a pilot light 86 to indicate completion of a horizontal index and to complete a circuit to a relay DRH through switches HSX2 and 2PEX3. Because of the narrowness of the area 2 and its position perpendicular to the direction of indexing the tool head is stopped precisely in its correct position. In the event that the tool head is stopped short of the precise position, corresponding to the point 47, the slit s2 will receive the reflection of an amount of light sufficient to prevent effective deenergization of the cell 2P. The machine cycle is thus interrupted until the operator, by manipulating the manual control switches, brings the tool head to the required position. On the other hand, if the operation of the motor 40 is continued to carry the tool head past the point 47 and the slit s2 past the area 2, the deenergization of the cell 2P as it passes the pattern area 2 will be effectual because, since the motor 40 is running at this time, the switch HS3 is open so that the closure of the switch 2PEX3 has no effect. Thus, the pattern area 2 coacts with the tracer to check the accuracy of the tool head stopping.

Energization of the relay DRH and closure of its switch DRH1 when the tool head has stopped precisely in the proper position initiates advance of the tool 11 to drill a hole 15. The relay CRI is thus energized and the closure of its switch CRI1 completes a circuit to a solenoid R1. The valve 29 (Fig. 16) is thus shifted to the right and pressure fluid is admitted to the head end of a cylinder 28 so that the piston therein is moved toward the left to advance the rotating tool 11 into the work 10. Upon completion of the hole, the limit switch LS3 is closed by a dog 87 (Fig. 2) to complete a circuit for a relay CRA. A switch CRA1 is thus opened to deenergize the relay CRI and consequently the solenoid R1, and another switch CRA2 closes to energize a relay LRF which latches its switches in energized position. The switch LRF1 then completes a circuit to a relay CRO whose switch CRO1 energizes a solenoid R2 to shift the valve 29 to its initial position for retracting the piston and the tool away from the work.

When the tool is fully retracted the limit switch LS1 is closed by the dog 87ᵃ to energize a relay CRB whose switch CRB1 is closed and coacts with the then closed switch LRF2 to energize a relay DC thus indicating that the tool has been withdrawn fully from the work. Opening of the switch DC1 deenergizes the sealed in relay HSX to close the switch HSX1 which coacts with a normally closed switch VT2 to energize the HF relay thereby reenergizing the motor 40 in the manner above described to continue the horizontal indexing along the line 46ᵃ (Fig. 7) leading to the next stopping point 47ᵃ.

Slowing down of the tool head and stopping thereof are effected under the control of opposite ends of the pattern area 45ᵃ in the manner above described. As will appear presently, there is no necessity at this time for checking the accuracy of this stopping. In the stopped position of the tool head and tracer, the light reflected from the pattern area 3ᵃ causes the photocell 3P and its relay 3PE to be deenergized and the relay 3PEX to be energized through the switch 3PE1. The switch 3PEX1 is therefore closed and because the opening of the switch HSX2 of the deenergized relay HSX is delayed as by a suitable timing device (not shown), a circuit is completed to a relay VTR which seals itself through a switch VTR1 before the switch HSX2 opens. Another switch VTR2 completes a circuit to the unlatching coil of the relay LRD so that its switches are permitted to return to deenergized position. In this position, the horizontal direction control relay HX is deenergized by opening of the switch LRD1 while closing of LRD2 energizes the vertical direction control VX. A condition is thus established whereby the relays HF, HS, and HSX for the motor 40 are disabled and the relays VF, VS, and VSX for the motor 33 are set up.

Closing of a switch VX1 at once completes a circuit to the fast relay VF which closes a switch VF1 and energizes the relay F whose switch F1 again connects the fast rheostat 72 into the power circuit to prepare for fast indexing by the motor 33. Closing of a switch VX2 completes a circuit to energize a relay V which then closes the switch V1 thereby energizing the motor 33. As above described, this motor is connected to the screw 32 so that rotation thereof moves the head 17 and the tool 10 vertically. At this time the relay RU is energized by reason of the initial setting of the manual selector switch 80 and the closing of the switch VX3 so that the head starts to move upwardly. As long as the selector switch remains as described, the head will always travel upwardly when a signal activates the photocell P3.

During the initial upward movement, the tracer is held ineffectual by disabling those controls which would otherwise respond to shaded areas over which the tracer must pass in leaving the point 47$^a$. In this instance, the relays DRH and DRV are the only ones which must be held inactive so as to prevent activating the tool operator when the slit s2 encounters the previously used area 45$^a$. To this end, each time one of the motors 33 or 40 runs, the relay IVRX is energized through a switch IVR1 of a relay IVR connected across the motor armatures and the switch IVRX2 closes and completes a circuit to a time delay coil VT of the timer 100, such as Cat. No. RO-10E manufactured by the Square D Company, whose switch VT1 does not become closed until the light beam spot 58 has passed over and beyond the pattern area 45$^a$. The switch VT1 is in the circuit for the relay VS which is thus prevented from slowing down the motor 33 even though the switch 3PEX2 is closed as the slit s3 is crossing the area 3$^a$. Another switch VT2 performs the same function for the relay HF.

After the tracer and the tool have moved upwardly beyond the range of control by the areas controlling the position 47$^a$, the switches VT1 and VT2 are actuated by the timer and the control mechanism is again conditioned for response to the next set 20$^b$ (Fig. 7) of control elements by which the tool head is slowed down and stopped in the position 47$^b$ through the action of the photocell 3P by which the now elongated area 3$^b$ is utilized to effect the slowing down and stopping. The accuracy of this stopping is checked by the relation of the pattern area 4$^b$ and the tracer slit s4. If the two coincide accurately, the photocell 4P deenergizes its relay 4PE but if the slit overlaps any unshaded area of the pattern as it will if the stopping is inaccurate, the relay 4PE will remain energized and thereby prevent continuance of the cycle until the position has been corrected under manual control. Deenergization of the relay 4PE closes a switch 4PE1 and also a switch 4PE2 to light a lamp 92 and indicate correct positioning of the tool head.

In the 47$^b$ position, a shaded area 2$^b$ initiates a drilling operation by deenergizing the photocell 2P and its relay 2PE which closes its switch 2PE1 to energize the relay 2PEX. The switch 2PEX2 of the latter coacts with the switch 4PE1 to energize a relay DRV whose switch DRV1 again energizes the relay CRI. The resulting energization of the solenoid R1 activates the drill operator to advance and retract the tool in the automatic cycle above described. It will be observed that the drilling operation after a vertical indexing is controlled by a different relay (DRV) than after a horizontal indexing (DRH). This is for the purpose of utilizing the stopping after vertical indexing to initiate a horizontal movement in a direction opposite to that of the previous horizontal indexing. This permits a succession of a row of holes to be drilled by progressing back and forth zig-zag fashion across the work as indicated by the line 75 (Fig. 6). As the slit s3 encounters the end 88$^b$ of the area 3$^b$, the photocell 3P deenergizes the relay 3PE and again energizes the relay 3PEX to close the switch 3PEX2 so that a circuit is completed through the switches VX1 and VT1 to energize the relay VS. Closure of the switch VS1 energizes the relay S whose switch S1 inserts the rheostat 73 in the power circuit to slow down the motor 33. When the end 89$^b$ of the area 3$^b$ is reached, the relay 3PEX is deenergized as is the relay VS, the excitation for the motor 33 being thus interrupted to effect stopping of the motor with the tool head precisely at the point 47$^b$.

As the drilling cycle comes to an end, the relay DC is energized as before by closure of the switch CRB1 which results from energization of the relay CRB by closure of LS1. At the same time, a switch DC3 is closed to complete a circuit through the then closed switches 4PE1 and 2PEX3 to energize a pair of relays 1HT and 2HT. If no drilling operation had occured at the point 47$^b$ due to the absence of an area 2$^b$, the relay 2PEX would be deenergized and its switch 2PEX2 would remain open but a circuit for the relays 1HT and 2HT would be completed through the normally closed switches 4PE1 and 2PEX5. Thus the relays 1HT and 2HT are energized immediately upon the arrival of the tool head at the position 47$^b$. It will be seen that the latter relays are only energized when the switch 4PE1 is closed and therefore after a vertical index has taken place. Energization of these relays first of all closes a switch 2HT1 which deenergizes the relay DRV and a switch 2HT2 which energizes and relatches the relay LRD. The latter deenergizes the vertical indexing control relay VX by opening the switch LRD2 and again energizes the horizontal indexing control relay HX by closing the switch LRD1 so that the circuits are conditioned for horizontal movement only.

The relay 2HT also opens its switch 2HT4 to deenergize a relay 2X which opens its switch 2X5 to deenergize the relay RU previously used in approaching the points 47, 47$^a$, and 47$^b$. Another switch 2HT3 maintains momentary energization of a relay 1X so that a circuit through switches 2HT5 and 1X2 will be completed as the switch 2X4 closes thus energizing the relay 3X. Such closure of the switch 3X4 completes a circuit through the switch 1HT3 to energize a relay 4X which opens a switch 4X3 to deenergize a relay 1X so that its switch 1X3 closes and completes a maintaining circuit for the relay 4X through the switch 4X1. The opening of the switch 2X5 drops out the relay RU and the closing of the switch 3X5 completes a circuit for energizing the relay LD through the then closed switch HX4. The relays RU and LD have switches RU1, RU2, LD1, and LD2 which respectively control the polarity of the current for exciting the armature circuits of the motors 33 and 40. With the relay LD energized, the motor 40 is conditioned for operation to drive the tool head and the tracer to the left.

After completion of such switching, the relay HF will be energized through the switches HX2 and VT2 and the resultant closure of HF2 will start the motor 40 at high speed as previously described. As soon as the motor starts, the relays IVR and IVRX are energized, and the switch IVRX3 is opened to deenergize the relays 1HT and 2HT which results in opening of the switch 2HT3 to deenergize the relay 1X. Also, as before, the switch IVRX2 is closed to energize the time delay relay VT. Its switch VT2 remains closed long enough to enable the tracer to pass beyond the previously used shaded pattern areas, there being no such interference areas on leaving the point 47ᵇ.

Due to the closeness of the next point 47ᶜ, the slit s1 will have encountered the pattern area 45ᶜ by the time that the relay VT actuates its switches whereupon slow down of the motor 40 will then be initiated by response of the photocell 1P which effects stopping of the motor as previously described when the tracer and tool reach the position 47ᶜ. In this position (Fig. 12), the shaded area 3ᶜ affects the photocell 3P to again deenergize the relay 3PE whose switch 3PE1 closes to energize the relay 3PEX and, as before described, energize the relay VTR through the switch 3PEX1. As before, the closure of the switch VTR2 energizes the unlatch coil of the relay LRD whose switch LRD1 opens to deenergize the horizontal index control relay HX and energizes the vertical index control relay VX. Closure of switch VX2 energizes the relay V whose switch V1 starts the motor 33 to initiate movement of the tool head and tracer toward the next point 47ᵈ. Since the relay 2X is now deenergized, the relay RU is again energized through the selector switch 80 and the switch VX3 so that the motor runs in a direction to again raise the tool head.

As previously described, the tracer control is disabled through the time delay relay VT as the tool head leaves the point 47ᶜ and the slit s3 passes at high speed over not only the area 3ᶜ but also over the area 45ᶜ. Slowing down of the motor occurs when the tracer encounters the edge 88ᵈ, the motor being stopped when the tracer reaches the point 47ᵈ as determined by the edge 89ᵈ of the area 3ᵈ. In the absence of a drilling control area in the pattern group 20ᵈ, the relays 1HT and 2HT are energized immediately through the closed switch 4PE1 and 2PEX5 by the closure of a switch 1VRX4 when the motor 33 comes to a stop and the voltage sensitive relays 1VR and 1VRX thereby become deenergized. As described before, the relays 1HT and 2HT transfer the control of the direction of operation of either motor 33 or 40 from the relays 3X and 4X to the relays 1X and 2X. It will be remembered that the relay 2X is associated with the relay RU while the relay 3X selects the relay LD.

Energization of the relays 1HT and 2HT again results in reversal of the direction of the next horizontal indexing this being effected by deenergizing the relays 3X and 4X and energizing the relays 1X and 2X. This occurs when the switch 1HT2 is opened as above described to deenergize the relay 3X which closes a switch 3X2 in the 2X relay circuit and energizes the relay 2X through the switches 1HT1 and 4X2. The closing of the switch 2X2 completes a circuit through the switch 2HT3 to energize the relay 1X. Closure of the switch 1X1 completes a temporary sealing circuit for this relay through the switch 2HT3. The opening of switch 3X5 and the closing of switch 2X5 deenergizes the relay LD and energizes the relay RU so that the motor 40 is conditioned for operation to shift the tool head to the right, this having been accomplished by closure of the switches LRD1 and HX3 in response to energization of the relay LRD and the ensuing energization of the relay HX which energizes the relay H. Actual starting of the motor occurs in response to the closure of the switch HX2 as described in connection with the approach to the previous positions of the tool head.

As soon as the motor starts to initiate movement of the tool head to the right along the line 90 (Fig. 7), the relay 1VRX is energized and opening of its switch 1VRX3 deenergizes the switching relays 1HT and 2HT. When this happens, a switch 2HT4 closes to maintain the circuit to the 2X relay and a switch 1HT3 opens the circuit of the relay 4X which is deenergized and closure of its switch 4X3 completes a permanent sealing circuit for the relay 1X. The delayed opening switch 2HT3 may then open the temporary seal of the relay 1X.

As in the case of the previously described horizontal indexing movements, the motor 40 will be slowed down and stopped at the successive points 47ᵉ, 47ᶠ, and the tool head dwelled in these positions until the control of the pattern areas 2ᵉ and 2ᵍ which, through the photocell 2P initiate cycles of advance and retraction of the tool as previously described. After each retraction is complete, the motor 40 is again restarted through the action of the relay HSX as described previously. At the far end of the line 90, the tool head and tracer are stopped at the point 47ᵍ under the control of the pattern area 45ᵍ of the group of control elements 20ᵍ. The latter incorporates the direction changing element 3ᵍ which acts through the photocell 3P in the same manner as the area 3ᵃ previously described to initiate operation of the motor 33 and vertical indexing of the tool head along the line 91.

The tool head is stopped in the position 47ʰ in the same manner as in the previous position 47ᵇ and, since there is no drilling control area in the group 20ʰ, the energization of the relays 1HT and 2HT is effected through the switch 2PEX5 instead of 2PEX2 and the switch DC3 as before. As a result, the relays 3X and 4X energized during the upward indexing are deenergized and the companion relays 1X and 2X are energized to reverse the output of the motor armature exciting circuits. At the same time, the relay LRD is energized and latched in to select the motor 40 for the ensuing horizontal indexing. Thereafter, the starting and stopping of the motor and the performance of the other functions at the succeeding points 47 along the path 75 are controlled in accordance with the arrangement of the pattern control elements in the corresponding groups 20.

It will be seen from the foregoing that under the control of the tracer and the successive groups 20 of elements on the pattern, the tool head will be indexed step by step along each horizontal portion of the path 75 and upwardly at the end of each such portion. After one step of upward indexing determined by the spacing of the horizontal rows of holes, indexing will be continued horizontally but always in the reverse direction in the example described. As a result, the tool head is, in this instance, indexed back and forth zig-zag fashion through a succession of horizontal and vertical steps at selected ones of which the tool head dwells during drilling of a hole in the workpiece.

After all of the holes have been completed in the workpiece under the automatic control of the pattern, the machine will be stopped automatically when the tracer moves away from the last group 20 of pattern elements that controlled the stopping in the position 47ᶻ (Fig. 6). As before, another horizontal indexing movement will be initiated and this will effect opening of a switch LS7 (Fig. 16) which deenergizes the relay LD. This interrupts the power supply to stop the motor. The automatic control is thus disabled. After removal of the finished workpiece, the tool head and tracer are moved back to starting position by again manipulating the manually operable indexing control switches 78, 79, 80, or 80ᵃ.

In the performance of the various functions, certain interlocks are utilized in accordance with well known practice, this being accomplished through relays and switches some of which are shown in Figs. 15, 16, and 17 but which, for the sake of simplicity have not been described in detail. Also, the overload relays and other limit switches ordinarily employed in circuits of the above character have been omitted.

We claim as our invention:

1. A machine tool having, in combination, a support for a workpiece, a support for a tool adapted to operate on different areas of the work, said supports being relatively movable back and forth along two paths extending transversely of each other and disposed in a common plane, reversible power actuators for the respective tool support, a tool actuator for relatively moving the work and tool perperpendicular to said plane to operate on a work area, a pattern fixed to one of said supports and having groups of control elements spaced apart to correspond to the positions of the work areas to be operated upon by the tool, said groups comprising different combinations of slow down, stopping, direction selection, position checking, and tool activating elements, a tracer connected to the other of said supports and having separate feelers responsive to the separate elements during the approach of the tool to and stopping thereof in one of said positions along one of said paths, mechanism controlled by said feelers and controlling said actuators in accordance with the arrangement of the elements of successive groups of elements to index the tool toward one of said positions, slow the approach to and then stop the tool in such position, and finally initiate movement of the tool toward the next group of elements, means controlled by said checking elements in the successive positions and operable upon each stopping of the tool head to check the accuracy of the stopping, and means responsive to the presence of a tool activating element in the group at any one of said stations to initiate a tool cycle by said tool actuator and delay the start to the next position until the tool cycle has been completed.

2. A machine tool having, in combination, a support for a workpiece, a support for a tool adapted to operate on different areas of the work, said supports being relatively movable back and forth along two paths extending transversely of each other and disposed in a common plane, reversible power actuators for the respective tool supports, a tool actuator for relatively moving the work and tool perpendicular to said plane to operate on a work area, a pattern connected to one of said supports and having groups of control elements spaced apart to correspond to the positions of the work areas to be operated upon by the tool, said groups comprising different combinations of slow down, stopping, direction selection, and tool activating elements, a tracer connected to the other of said supports and having separate feelers responsive to the respective elements of each group during the approach of the tool to and stopping thereof in one of said positions along one of said paths, and mechanisms controlled by said feelers and controlling said actuators in accordance with the arrangement of the elements of successive ones of said groups to index the tool toward the next one of said positions, slow the approach to and then stop the tool in such position, activate the tool in the presence of a tool activating element in the group and finally initiate movement of the tool toward the next group of elements.

3. A machine tool as defined by claim 2 in which a single feeler of the tracer effects both the slowing down and stopping of the tool support by response successively to different control elements spaced along the line of approach of the tool support to the stopping point.

4. A machine tool having, in combination, a support for a workpiece, a support for a tool adapted to operate on different areas of the work, said supports being relatively movable back and forth along two paths extending transversely of each other and disposed in a common plane, reversible power actuators for the respective tool supports, a tool actuator for relatively moving the work and tool perpendicular to said plane to operate on a work area, a pattern connected to one of said supports and having groups of control elements spaced apart to correspond to the positions of the work areas to be operated upon by the tool, said groups comprising different combinations of slow down, stopping, and direction selection, a tracer connected to the other of said supports and having separate feelers responsive to the separate elements of each group during the approach of the tool to and stopping thereof in one of said positions along one of said paths, mechanisms controlled by said feelers and controlling said actuators in accordance with the arrangement of the elements of successive groups to advance the tool toward one of said positions, slow the approach to and then stop the tool in such position, and select the direction of movement of the tool toward the next group of elements, and mechanism responsive to the presence of a tool activating pattern element in any one of said groups of elements to activate said tool actuator and dwell the tool head pending completion of a tool cycle.

5. A machine tool having, in combination, a support for a workpiece, a support for a tool adapted to operate on different areas of the work, said supports being relatively movable back and forth along two paths extending transversely of each other and disposed in a common plane, reversible power actuators for the respective tool supports, a tool actuator for relatively moving the work and tool perpendicular to said plane to operate on a work area, a pattern connected to one of said supports and having groups of control elements spaced apart to correspond to the positions of the work areas to be operated upon by the tool, said groups comprising different combinations of stopping, direction selection, and tool activating elements, a tracer connected to the other of said supports and having separate feelers responsive to the separate elements during the approach of the tool to and stopping thereof in one of said positions along one of said paths, mechanisms controlled by said feelers and controlling said actuators in accordance with the arrangement of the elements of successive groups to advance the tool toward one of said positions, stop the tool in such position, and finally initiate indexing of the tool toward the next group of elements, and mechanism responsive to the presence of a tool activating pattern element in any one of said groups to activate said tool actuator and dwell the tool head during advance and retraction of the tool.

6. A machine tool as defined by claim 5 having switching mechanism operable automatically in response to a change in the direction of indexing of said tool support to transfer the control of one of said tracer feelers from one control element of one of said groups to a different element of the next group.

7. A machine tool of the character defined by claim 5 having a mechanism including a timer for disabling said tracer until the latter has moved out of operative association with the pattern areas controlling the stopping and functioning of the tool support in the previous stopped position.

8. A machine tool as defined by claim 5 in which the pattern control elements of each group are spaced from each other in the same relation with respect to points corresponding to the respective stopped positions of the tool and the tracer feelers are correspondingly spaced to sense the respective pattern elements in each of said stopped positions.

9. A machine tool as defined by claim 5 in which the control elements of each group and the feelers of the tracer are spaced angularly around points which register with each other in the stopped position of the tool support.

10. A machine tool as defined by claim 9 in which one of the tracer feelers senses the position of a separate pattern element to check the accuracy of the stopping by other feelers and pattern elements.

11. A machine tool as defined by claim 5 in which the tracer feelers comprise photoelectric cells simultaneously responsive to light beams controlled as to intensity by different pattern areas.

12. A machine tool as defined by claim 11 in which the pattern areas controlling the stopping of the tool support narrow in the direction of approach of the support to the stopping point and are elongated in a perpendicular direction.

13. A machine tool as defined by claim 11 in which the photoelectric cells are angularly spaced around the stopping point of the tool support.

14. A machine tool as defined by claim 11 in which the pattern areas are angularly spaced approximately a quarter revolution apart around the stopping point of the tool support.

15. A machine tool as defined by claim 11 in which the light affecting the photocells is reflected off from the different pattern areas to the respective photocells.

16. A machine tool as defined by claim 11 in which the several photocells of the tracer are affected by light from a common source.

17. A machine tool as defined by claim 16 in which the single light source is mounted on the tool support and is reflected onto the respective photocells from different areas of the pattern, the latter being disposed on the side of the tracer remote from the work support.

18. A machine tool having, in combination, a support for a workpiece, a support for a tool adapted to operate on different areas of the work, said supports being relatively movable back and forth along two paths extending transversely of each other and disposed in a common plane, reversible power actuators for the respective tool supports, a tool actuator for relatively moving the work and tool perpendicular to said plane to operate on a work area, a pattern connected to one of said supports and having groups of control elements spaced apart to correspond to the positions of the work areas to be operated upon by the tool, said groups comprising different combinations of stopping, direction selection, and tool activating elements, a tracer connected to the other of said supports and having separate feelers responsive to the separate elements during the approach of the tool to and stopping thereof in one of said positions along one of said paths, mechanisms controlled by said feelers and controlling said actuators in accordance with the arrangement of the elements of successive groups to advance the tool support in different directions zig-zag fashion from one position to another through a plurality of intermediate positions, and mechanism responsive to the presence of a tool activating pattern element in the group controlling any one of said positions to activate said tool actuator and advance and retract the tool during dwelling of the tool support in such position.

References Cited in the file of this patent

UNITED STATES PATENTS

| | | |
|---|---|---|
| 1,069,995 | Anderson | Aug. 12, 1913 |
| 1,683,581 | Shaw | Sept. 4, 1928 |
| 2,000,553 | Alden | May 7, 1935 |
| 2,059,505 | Wright | Nov. 3, 1936 |
| 2,225,915 | Losier | Dec. 24, 1940 |
| 2,226,677 | Vikhman | Dec. 31, 1940 |
| 2,301,171 | Morton | Nov. 3, 1942 |